United States Patent
Li et al.

(10) Patent No.: US 12,149,434 B2
(45) Date of Patent: Nov. 19, 2024

(54) DATA TRANSMISSION METHOD AND APPARATUS

(71) Applicant: HUAWEI TECHNOLOGIES CO., LTD., Shenzhen (CN)

(72) Inventors: Hongfeng Li, Beijing (CN); Dongfeng Li, Beijing (CN); Haizhou Xiang, Shenzhen (CN); Jin Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 332 days.

(21) Appl. No.: 17/729,163

(22) Filed: Apr. 26, 2022

(65) Prior Publication Data
US 2022/0255873 A1    Aug. 11, 2022

Related U.S. Application Data (63) Continuation of application No. PCT/CN2020/124128, filed on Oct. 27, 2020.

(30) Foreign Application Priority Data

Oct. 28, 2019 (CN) .......................... 201911033612.X (51) Int. Cl.
*H04L 43/0852* (2022.01)
*H04L 43/091* (2022.01)
(Continued)

(52) U.S. Cl.
CPC .......... *H04L 45/22* (2013.01); *H04L 43/0852* (2013.01); *H04L 43/091* (2022.05);
(Continued)

(58) Field of Classification Search
CPC ..... H04L 41/02–5096; H04L 43/02–55; H04L 45/02–851; H04L 47/10–83; H04L 49/10–9094; H04L 69/02–40
See application file for complete search history.

(56) References Cited

U.S. PATENT DOCUMENTS

| | | |
|---|---|---|
| 5,777,988 A | 7/1998 | Cisneros |
| 2015/0188804 A1 | 7/2015 | Ashwood-Smith |
| (Continued) | | |

FOREIGN PATENT DOCUMENTS

| | | |
|---|---|---|
| CN | 107968748 A | 4/2018 |
| CN | 108028800 A | 5/2018 |

OTHER PUBLICATIONS

Lin Wei et al., "Achieving Optimized Traffic Sharing over Equal-Cost-Multi-Paths Using LRU-based Caching with Counting Scheme", Acta Electronica Sinica, vol. 36, No. 1, Jan. 2008, pp. 32-38.
(Continued)

*Primary Examiner* — Timothy J Weidner
(74) *Attorney, Agent, or Firm* — Maier & Maier, PLLC (57) ABSTRACT

A data transmission method includes detecting a delay between a source end and a sink end; determining a to-be-used second path when a first path currently used to transmit a packet is determined to be a congested path; determining a delay difference between the first path and the second path based on a delay of the first path and a delay of the second path; and sending one or more to-be-sent packets to the sink end through the second path based on the delay difference.

14 Claims, 2 Drawing Sheets

(51) Int. Cl.
*H04L 45/00* (2022.01)
*H04L 45/12* (2022.01)
*H04L 47/122* (2022.01)
*H04L 47/283* (2022.01)

(52) U.S. Cl.
CPC .......... *H04L 45/123* (2013.01); *H04L 45/124* (2013.01); *H04L 45/127* (2013.01); *H04L 47/122* (2013.01); *H04L 47/283* (2013.01)

(56) References Cited

U.S. PATENT DOCUMENTS

| | | |
|---|---|---|
| 2016/0028603 A1* | 1/2016 | Chakrabart .......... H04L 43/0852 |
| 2016/0218979 A1* | 7/2016 | Roh ...................... H04L 47/122 |
| 2019/0109787 A1* | 4/2019 | Chen ...................... H04L 47/11 |

OTHER PUBLICATIONS

Benet et al., "FlowDyn: Towards a Dynamic Flowlet Gap Detection using Programmable Data Planes", arxiv.org, Cornell University Library, 201 Olin LibraryCornell University Ithaca, NY 14853, Oct. 8, 2019, 7 pages.

Kandula et al., "Dynamic Load Balancing Without Packet Reordering", Computer Communication Review, ACM, New York, NY, US, vol. 37, No. 2, Apr. 2007, 11 pages.

* cited by examiner

DATA TRANSMISSION METHOD AND APPARATUS

CROSS-REFERENCE TO RELATED APPLICATIONS

This application is a continuation of International Application No. PCT/CN2020/124128, filed on Oct. 27, 2020, which claims priority to Chinese Patent Application No. 201911033612.X, filed on Oct. 28, 2019. The disclosures of the aforementioned applications are hereby incorporated by reference in their entireties.

TECHNICAL FIELD

The embodiments relate to the field of communications technologies, and in particular, to a data transmission method and apparatus.

BACKGROUND

With development of information technologies, volumes of network communications services are increasing rapidly, and a quantity of packets transmitted in the services is increasing constantly. This causes a problem of network congestion. To solve the problem of network congestion, in a process of consecutively sending packets from a source end to a sink end, if detecting that a current data transmission path is congested, the source end may switch to a new data transmission path and send subsequent to-be-sent packets to the sink end through the new data transmission path.

If a delay of the new data transmission path is shorter than a delay of the original data transmission path, a packet transmitted through the original data transmission path may arrive at the sink end later than a packet transmitted through the new data transmission path. In this way, a sequence of packets received by the sink end is different from an actual sequence of packets sent by the source end, that is, packet disorder occurs.

The packet disorder may cause an error in packet parsing performed by the sink end. Therefore, currently, a data transmission method that can resolve the packet disorder is urgently needed.

SUMMARY

Embodiments provide a data transmission method and apparatus, to resolve packet disorder caused when a path is switched. The solution is as follows.

According to a first aspect, a data transmission method is provided, where the method includes:
  detecting a delay of each path between a source end and a sink end;
  determining a to-be-used second path when a first path currently used to transmit a packet is determined to be a congested path;
  determining a delay difference between the first path and the second path based on a delay of the first path and a delay of the second path; and
  sending one or more to-be-sent packets to the sink end through the second path based on the delay difference.

In the solution shown in this embodiment, the to-be-sent packets may be a packet flow of a service, and the to-be-sent packets include a plurality of packets with a same destination. The delay of each path is detected by sending a measurement packet through each path between the source end and the sink end. The detected delay is compared with a standard delay of the path to determine whether the path is the congested path. When a current path is determined to be the congested path, a non-congested second path is selected from remaining paths. Then, a delay difference between the current first path and the selected second path is calculated. Finally, based on the delay difference, it may be determined when to switch to the second path to send the to-be-sent packets, to avoid packet disorder.

In a possible implementation, the determining a delay difference between the first path and the second path based on a delay of the first path and a delay of the second path includes:
  subtracting the delay of the second path from the delay of the first path to obtain the delay difference between the first path and the second path.

In a possible implementation, the sending one or more to-be-sent packets to the sink end through the second path based on the delay difference includes:
  if the delay difference is less than 0, sending the to-be-sent packets to the sink end through the second path.

In the solution shown in this embodiment, when the delay difference is less than 0, that is, the delay of the second path is greater than the delay of the first path, the to-be-sent packets are directly sent through the second path, and packets also arrive at the sink end later than a packet previously sent through the first path. Therefore, the packet disorder does not occur.

In a possible implementation, the sending one or more to-be-sent packets to the sink end through the second path based on the delay difference includes:
  if the delay difference is greater than 0, determining, in the to-be-sent packets, whether there are two adjacent packets whose sending time points are within preset duration after a current time point and whose sending time interval is greater than the delay difference;
  if there are such adjacent packets, sending, to the sink end through the first path, a first packet whose sending sequence is earlier in the two adjacent packets whose sending time interval is greater than the delay difference, and a packet whose sending sequence is earlier than the first packet in the to-be-sent packets, and sending, to the sink end through the second path, a second packet whose sending sequence is later in the two adjacent packets, and a packet whose sending sequence is later than the second packet in the to-be-sent packets;
  if there are no such adjacent packets, determining, at least one buffer device from network devices on the second path; and
  sending the to-be-sent packets to the sink end through the second path, where in a process of transmitting the to-be-sent packets through the second path, the to-be-sent packets pass through each buffer device, the buffer device is configured to buffer the to-be-sent packets, and a sum of buffer duration of each buffer device for the to-be-sent packets is greater than or equal to the delay difference.

In the solution shown in this embodiment, for a case in which the delay difference is greater than 0, that is, the delay of the second path is less than the delay of the first path. It may be first determined whether there are two adjacent packets whose sending time interval is greater than the delay difference in preset duration after a current time point. If there are such adjacent packets, the source end sends, to the sink end through the first path, a first packet whose sending sequence is earlier in the two adjacent packets, and a packet whose sending sequence is earlier than the first packet in the to-be-sent packets, and sends, to the sink end through the second path, a second packet whose sending sequence is later in the two adjacent packets, and a packet whose sending sequence is later than the second packet in the to-be-sent packets. In this way, the delay difference between the first path and the second path may be offset by using the sending time intervals between the packets, and the packet disorder also does not occur. It should be noted that, to avoid sending excessive packets through the first path, the preset duration may be generally set to a small value.

In addition, if the two adjacent packets meeting the foregoing requirement are not found, at least one network device may be determined as a buffer device on the second path to buffer the to-be-sent packets, and a sum of buffer duration of buffer devices for the packet is greater than or equal to the delay difference. In this way, the delay difference can be offset, and the packet disorder is avoided.

In a possible implementation, if there are no such adjacent packets, the determining, at least one buffer device from network devices on the second path, the method further includes:
writing identification information of each of the at least one buffer device and corresponding buffer duration into preset fields of the first packet in the to-be-sent packets.

In the solution shown in this embodiment, to enable the network device that is determined as the buffer device on the second path to know that the network device needs to buffer a packet, the identification information of the buffer device and the corresponding buffer duration are added to the first packet in the to-be-sent packets. After receiving the packet, the network device first determines whether identification information in the packet matches the identification information of the network device. If the identification information in the packet matches the identification information of the network device, the network device buffers the packet based on the corresponding buffer duration. If the identification information does not match the identification information of the network device, the network device directly forwards the packet to a next network device.

In a possible implementation, the method further includes:
obtaining, based on a preset period, buffer capability information of each network device on each path between the source end and the sink end, and correspondingly storing identification information and the buffer capability information of each network device, where the buffer capability information of each network device is used to indicate maximum buffer duration or a buffer duration range of the network device for a packet.

In the solution shown in this embodiment, the source end may learn a buffer capability of the network device on each path in advance, to subsequently determine the buffer device and allocate buffer time.

According to a second aspect, a data transmission apparatus is provided, where the apparatus includes:
a detection module, configured to detect a delay of each path between a source end and a sink end;
a determining module, configured to determine a to-be-used second path when a first path currently used to transmit a packet is determined to be a congested path;
a computing module, configured to determine a delay difference between the first path and the second path based on a delay of the first path and a delay of the second path; and
a sending module, configured to send one or more to-be-sent packets to the sink end through the second path based on the delay difference.

In a possible implementation, the computing module is configured to:
subtract the delay of the second path from the delay of the first path to obtain the delay difference between the first path and the second path.

In a possible implementation, the sending module is configured to:
if the delay difference is less than 0, send the to-be-sent packets to the sink end through the second path.

In a possible implementation, the sending module is configured to:
if the delay difference is greater than 0, determine, in the to-be-sent packets, whether there are two adjacent packets whose sending time points are within preset duration after a current time point and whose sending time interval is greater than the delay difference;
if there are such adjacent packets, send, to the sink end through the first path, a first packet whose sending sequence is earlier in the two adjacent packets whose sending time interval is greater than the delay difference, and a packet whose sending sequence is earlier than the first packet in the to-be-sent packets, and send, to the sink end through the second path, a second packet whose sending sequence is later in the two adjacent packets, and a packet whose sending sequence is later than the second packet in the to-be-sent packets;
if there are no such adjacent packets, determine, at least one buffer device from network devices on the second path; and
send the to-be-sent packets to the sink end through the second path, where in a process of transmitting the to-be-sent packets through the second path, the to-be-sent packets pass through each buffer device, the buffer device is configured to buffer the to-be-sent packets, and a sum of buffer duration of each buffer device for the to-be-sent packets is greater than or equal to the delay difference.

In a possible implementation, the apparatus further includes:
a writing module, configured to write identification information of each of the at least one buffer device and corresponding buffer duration into preset fields of the first packet in the to-be-sent packets.

In a possible implementation, the apparatus further includes:
a storage module, configured to obtain, based on a preset period, buffer capability information of each network device on each path between the source end and the sink end, and correspondingly store identification information and the buffer capability information of each network device, where the buffer capability information of each network device is used to indicate maximum buffer duration or a buffer duration range of the network device for a packet.

According to a third aspect, a source end is provided, including a processor and a memory.

The memory stores one or more programs, and the one or more programs are configured to be executed by the processor to implement the method according to the first aspect.

According to a fourth aspect, a computer-readable storage medium is provided, including instructions, where when the computer-readable storage medium is run on a source end, the source end is enabled to perform the method according to the first aspect.

According to a fifth aspect, a computer program product is provided, including instructions, where when the computer program product runs on a source end, the source end is enabled to perform the method according to the first aspect.

Beneficial effects brought by the solutions provided in the embodiments are as follows.

In the embodiments, the source end may detect the delay of each path between the source end and the sink end and determine the second path after a path currently used to transmit a packet is determined to be the congested path. In addition, a delay difference between the detected delay of the current path and the delay of the second path may be obtained. Finally, when a packet is sent through the second path, the packet is sent based on the determined delay difference. In this way, when a packet is sent through the second path, a delay difference is considered. This can effectively avoid packet disorder caused by the delay difference.

DETAILED DESCRIPTION OF EMBODIMENTS

A data transmission method provided in the embodiments may be applied to a network device that sends a packet. The network device may be referred to as a source network device or a source end and is collectively referred to as a source end in the embodiments. Embodiments may be applied to the following scenarios. In a process of sending, by the source end, a packet to a sink end, when finding that a current path is congested, the source end may find a non-congested path to send the packet. In this case, the method provided in the embodiments may be used to forward the packet through the non-congested path to avoid packet disorder.

Figure 1:
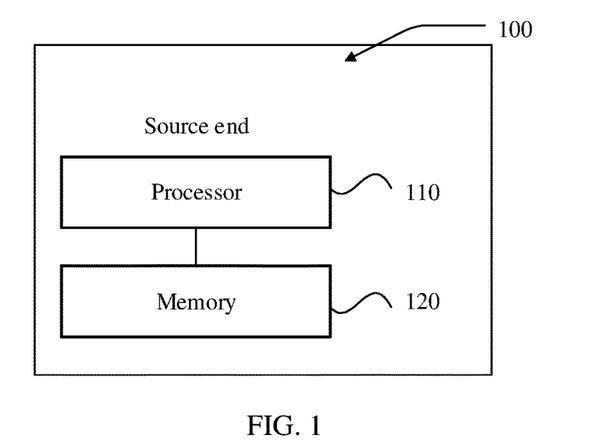
FIG. 1 is a schematic diagram of a structure of a source end according to an embodiment.

The source end may be a router. FIG. 1 is a schematic diagram of a structure of a source end. The source end 100 may include a processor 110 and a memory 120. The processor 110 may be a central processing unit (CPU). The processor 110 may be one processor or may include a plurality of processors. The memory 120 may include a volatile memory, for example, a random access memory (RAM). The memory may alternatively include a nonvolatile memory, for example, a read-only memory (ROM), a flash memory, and the like. The memory may further include a combination of the foregoing types of memories. The memory 120 may be one memory or may include a plurality of memories. The memory 120 stores at least one instruction, and the at least one instruction is loaded and executed by the processor 110, to implement the data transmission method provided in the embodiments.

Figure 2:
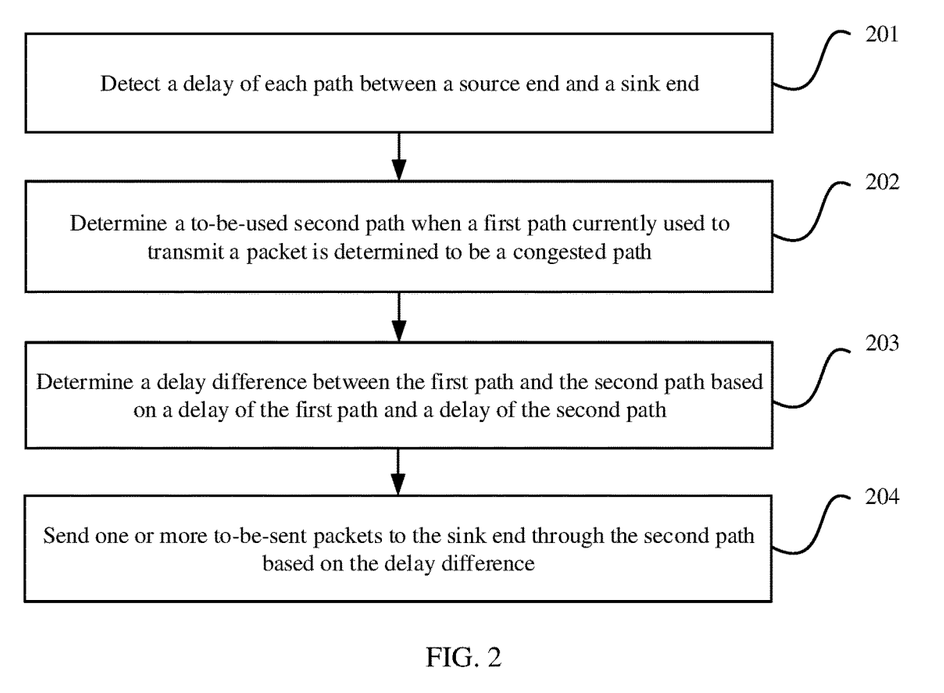
FIG. 2 is a flowchart of a data transmission method according to an embodiment.

FIG. 2 shows a data transmission method according to an embodiment. The method may be implemented by a source end, and a processing procedure of the method may include the following steps.

Step 201: Detect a delay of each path between the source end and a sink end.

During implementation, the source end may send a measurement packet through each path between the source end and the sink end based on a preset measurement period. The preset measurement period, for example, 3 milliseconds (ms), may be set by a person based on an actual situation. The measurement packet sent through each path may carry sending time of the measurement packet, and when receiving the measurement packet, the sink end may obtain receiving time. After receiving the measurement packet, the sink end may return a corresponding response packet to the source end through a path for sending the measurement packet. The response packet may carry the receiving time of the corresponding measurement packet. After receiving the response packet, the source end obtains the receiving time carried in the response packet and subtracts the sending time of the corresponding measurement packet from the receiving time, to obtain a delay of the path.

Step 202: Determine a to-be-used second path when a first path currently used to transmit a packet is determined to be a congested path.

During implementation, each path may have a standard delay. For the first path currently used to transmit the packet, if it is detected in a preset period that a delay of the first path is greater than a standard delay of the first path, the first path is considered to be the congested path. Load sharing needs to be performed on the first path, and the source end may determine the to-be-used second path based on an actual situation of remaining paths between the source end and the sink end. For example, the source end may also determine, based on the respective standard delays and the detected delays of remaining paths, whether the path is congested, and select, from the non-congested paths, a path with a minimum detected delay as the to-be-used second path.

Step 203: Determine a delay difference between the first path and the second path based on a delay of the first path and a delay of the second path.

During implementation, after the second path is determined, the delay difference between the first path and the second path may be determined based on the delay of the first path and the delay of the second path. The delay of the second path may be subtracted from the delay of the first path to obtain the delay difference between the first path and the second path.

In addition, in step 201, the response packet returned by the sink end to the source end may further carry packet loss information and disorder information of the received measurement packet. A standard measurement packet may be stored in the sink end. After the measurement packet sent by the source end is received, the received measurement packet may be compared with the stored standard measurement packet to calculate a packet loss rate and a quantity of disorder packets. The packet loss rate is the foregoing packet loss information, and the quantity of disorder packets is the foregoing disorder information. Further, in addition to the foregoing packet loss information and the disorder information, the returned response packet may further carry other information that can reflect integrity of the received measurement packet. After receiving the response packet, the source end may obtain the packet loss rate and the quantity of disorder packets carried in the response packet. If the packet loss rate and the quantity of disorder packets are greater than respective preset values, the source end may adjust the calculated delay difference, and add an adjustment value to the calculated delay difference. The adjustment value is greater than 0. The delay difference in the subsequent steps is the adjusted delay difference. Also, if both the packet loss rate and the quantity of disorder packets are less than the respective preset values, the calculated delay difference may not be adjusted.

Step 204: Send one or more to-be-sent packets to the sink end through the second path based on the delay difference.

The to-be-sent packets may be a packet flow of a service. Packets in the packet flow have a same destination, and the destination of the packets is the foregoing sink end.

During implementation, there may be the following several cases when the to-be-sent packets are sent to the sink end through the second path based on the delay difference.

Case 1: If the foregoing delay difference is less than 0, the to-be-sent packets are sent to the sink end through the foregoing second path.

When the delay difference is less than 0, that is, the delay of the second path is greater than the delay of the first path, the path is switched to the second path for sending the packets, and packets subsequently sent through the second path naturally arrive at the sink end later than packets previously sent through the first path.

Case 2: If the foregoing delay difference is greater than 0, it is determined, in the to-be-sent packets, whether there are two adjacent packets whose sending time points are within preset duration after a current time point and whose sending time interval is greater than the foregoing delay difference. If there are such adjacent packets, the source end sends, to the sink end through the first path, a first packet whose sending sequence is earlier in the two adjacent packets whose sending time interval is greater than the foregoing delay difference, and a packet whose sending sequence is earlier than the first packet in the to-be-sent packets, and sends, to the sink end through the second path, a second packet whose sending sequence is later in the two adjacent packets, and a packet whose sending sequence is later than the second packet in the to-be-sent packets.

Case 3: If the foregoing delay difference is greater than 0, and there are no such adjacent packets whose sending time points are within preset duration after a current time point and whose sending time interval is greater than the foregoing delay difference, at least one buffer device from network devices on the second path is determined; and the to-be-sent packets are sent to at least one buffer device for buffering, where a sum of buffer duration of each buffer device for the to-be-sent packets is equal to the delay difference.

During implementation, the source end may perform path detection for one time every preset period, where the preset period may be N times the foregoing preset measurement period, and N may be 100, that is, the path detection is performed for one time every N preset measurement period. The path detection may enable the source end to obtain a buffer capability of the network device of each intermediate node and a buffer capability of the sink end, and may further determine a path status, that is, whether the path is a valid path or an invalid path. The valid path is a path through which normal data transmission can be performed. The invalid path is a path through which normally transmit data cannot be performed due to a link fault in the path or a network device fault of an intermediate node. In addition, the buffer capability of the network device of each intermediate node in the path and the buffer capability of the sink end may be preconfigured in the source end by a skilled person, and the source end performs storage management. The following describes a process in which the source end performs the path detection on any path between the source end and the sink end to obtain the buffer capability of each network device on the path.

Figure 3:
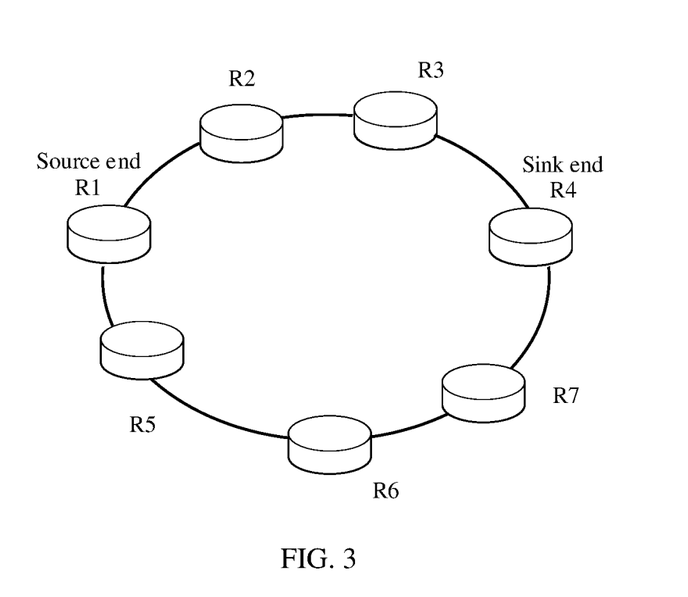
FIG. 3 is a schematic diagram of a packet transmission path according to an embodiment.

As shown in FIG. 3, a source end is R1, a sink end is R4, and there are two paths between R1 and R4, respectively R1-R2-R3-R4 and R1-R5-R6-R7-R4. The path R1-R2-R3-R4 is used as an example for description. R1 sends a probe packet to R2. After receiving the probe packet, R2 adds buffer capability information A of R2 and identification information of R2 to the probe packet, and forwards the added probe packet to R3. After receiving the probe packet sent by R2, R3 adds buffer capability information B of R3 and identification information of R3 to the probe packet, and forwards the added probe packet to R4. After receiving the probe packet sent by R3, R4 adds buffer capability information C of R4 and identification information of R4 to the probe packet, re-encapsulates the probe packet and returns the probe packet to RE In this way, R1 may obtain the buffer capability information of R2, R3, and R4, and correspondingly store a buffer capability and identification information of each network device. The identification information may be a route ID (router Identity document, router-ID) of the network device. The route ID can be used to uniquely identify a network device. The following Table 1 is a table of correspondence between identification information and buffer capability information of a network device.

TABLE 1

| Identification information of a network device | Buffer capability information |
| --- | --- |
| R2 | A |
| R3 | B |
| R4 | C |

The foregoing buffer capability information may be maximum buffer duration that each network device can provide or may be a buffer capability level. Table 1 below is a buffer capability level table.

TABLE 2

| Buffer capability level | Buffer duration (ms) |
| --- | --- |
| 8 | 80 |
| 7 | 70 |
| 6 | 60 |
| 5 | 50 |
| 4 | 40 |
| 3 | 30 |
| 2 | 20 |
| 1 | 10 |
| 0 | 0 (No buffer capability) |

As shown in Table 2, a buffer capability of a network device is classified into eight levels. A level 0 indicates no buffer capability, a level 1 indicates that buffer duration that can be provided is between 0 ms and 10 ms, a level 2 indicates that buffer duration that can be provided is between 10 ms and 20 ms, and the rest may be deduced by analogy. The buffer capability level table may be stored in the source end. After a buffer capability level of a network device is obtained, a buffer duration range that the network device can provide may be determined by querying the capability level table.

When determining a buffer device, the source end may preferentially determine whether a buffer capability of the source end can meet a buffer requirement, that is, whether buffer duration that the source end can provide is greater than the foregoing delay difference. If the buffer duration is greater than the foregoing delay difference, the buffer capability is considered to meet the buffer requirement, and if the buffer capability is less than the foregoing delay difference, the buffer capability fails to meet the buffer requirement. If the source end determines that the buffer capability of the source end can meet the buffer requirement, the source end serves as a buffer device to buffer the to-be-sent packets, and when the buffer duration reaches the foregoing delay difference, sends the to-be-sent packets to the sink end through the second path.

If the source end determines that the buffer capability of the source end can meet the buffer requirement, the source end may query locally stored buffer capability information of each network device on the second path. The source end may determine, in each network node, a network device whose buffer capability meets the buffer requirement as the buffer device. If a network device whose buffer capability meets the buffer requirement, the network device is determined as the buffer device, and the source end writes, into preset fields of the first packet in the to-be-sent packets, identification information of the buffer device and buffer duration that the buffer device needs to provide for the packet. Then, the source end sends the to-be-sent packets to the sink end through the second path. After receiving the packet, each network device on the second path may determine whether identification information carried in the packet matches the identification information of the network device. If the identification information carried in the packet matches the identification information of the network device, the network device buffers the packet, and forwards the packet to a next network device after reaching the buffer duration carried in the packet. If the identification information carried in the packet does not match the identification information of the network device, the network device can directly forward the packet to a next network device.

If the source end determines that the buffer capability of each network device on the second path fails to meet the buffer requirement, the source end may determine a plurality of network devices from the network devices on the second path as the buffer device to perform multi-level buffering on the packet. When the buffer device is selected, the buffer device may be selected in descending order based on the buffer capability. In a case in which the buffer capability information is the buffer capability level, when the buffer device is selected, the buffer device may be first selected from a network device with a highest buffer capability level. If a sum of buffer duration that a network device with the highest buffer capability level can provide still does not reach the foregoing delay difference, the source end continues to select a network device with a second highest buffer level, and the rest may be deduced by analogy. In a case in which the buffer capability information is the maximum buffer duration that the network device can provide, buffer devices are preferentially selected in descending order of the maximum buffer duration, and a sum of the maximum buffer duration that the buffer devices can provide is greater than or equal to the foregoing delay difference. In the determined buffer devices, buffer duration corresponding to a buffer device with a high buffer capability may be maximum buffer duration that the buffer device can provide, and buffer duration provided by a buffer device with a lowest buffer capability may be a sum of the delay difference and buffer duration provided by remaining buffer devices. After the plurality of buffer devices and the buffer duration that each buffer device needs to provide are determined, the identification information of each buffer device and the corresponding buffer duration are written into preset fields of the first packet in the to-be-sent packets. Then, the source end sends the to-be-sent packets to the sink end through the second path. After receiving the packet, each network device on the second path may determine whether identification information carried in the packet matches the identification information of the network device. If the identification information carried in the packet matches the identification information of the network device, the network device buffers the packet, and forwards the packet to a next network device after reaching the buffer duration carried in the packet. If the identification information carried in the packet does not match the identification information of the network device, the network device can directly forward the packet to a next network device.

There are a plurality of methods for buffering a packet performed by the network device. Two of the methods are listed below for description.

Method 1: A CPU controls an enabled or disabled state of a buffer queue.

After receiving the to-be-sent packets and determining that the to-be-sent packets need to be buffered, the network device searches for an idle buffer queue to buffer the to-be-sent packets. A quantity of packets that can be buffered in each buffer queue is limited. In this case, to avoid that a packet that is in the to-be-sent packets and that is later sent to the network device is sent before a packet that is earlier sent to the network device, a high priority is assigned to a packet in the buffer queue in which a first packet in the to-be-sent packets is located. Packets in remaining buffer queues are assigned with a normal priority. The CPU performs timing by using software, and when the buffer duration that needs to be provided reaches, the buffer queue is enabled, and a packet with a high priority is sent at a line rate of a port of the network device in a priority queuing (PQ) absolute scheduling manner. After all the high priority packets are sent, the normal priority packets are subsequently sent. After the packets are sent, the buffer queue is disabled and restored to the idle state.

Method 2: A queue is cyclically buffered through traffic management (TM).

The TM provides N buffer queues that are cyclically enabled and disabled. The buffer queues switch to an enabled or disabled state based on a period T. Each buffer queue has the same period but different phases. Adjacent buffer queues differ by one phase, for example, 10 ms. After receiving the to-be-sent packets and determining that the to-be-sent packets need to be buffered, the network device may search for a buffer queue that is currently in a disabled state (idle). Then, for each buffer queue in the disabled state, a time interval of the buffer queue between a current time point and an enabling time point is determined. A buffer queue with a minimum time interval is selected to buffer the to-be-sent packets, a high priority is assigned to a packet in a buffer queue in which a first packet in the to-be-sent packets is located, and a normal priority is assigned to a packet in remaining buffer queues. When it is the enabling time point, the buffer queue is enabled, and packets with high priorities are sent through a port line of the network device in an absolute scheduling mode. After all the high priority packets are sent, the normal priority packets are subsequently sent.

In addition, it should be noted that embodiments of this application can be applicable to a plurality of protocols such as a transmission control protocol (TCP) and a user datagram protocol (UDP). A protocol to which the method is applied is not limited in this embodiment.

According to the data transmission method provided in this embodiment, the source end may detect the delay of each path between the source end and the sink end and determine the second path after a path currently used to transmit a packet is determined to be the congested path. In addition, a delay difference between the detected delay of the current path and the delay of the second path may be obtained. Finally, when a packet is sent through the second path, the packet is sent based on the determined delay difference. In this way, when a packet is sent through the second path, a delay difference is considered. This can effectively avoid packet disorder caused by the delay difference.

Figure 4:
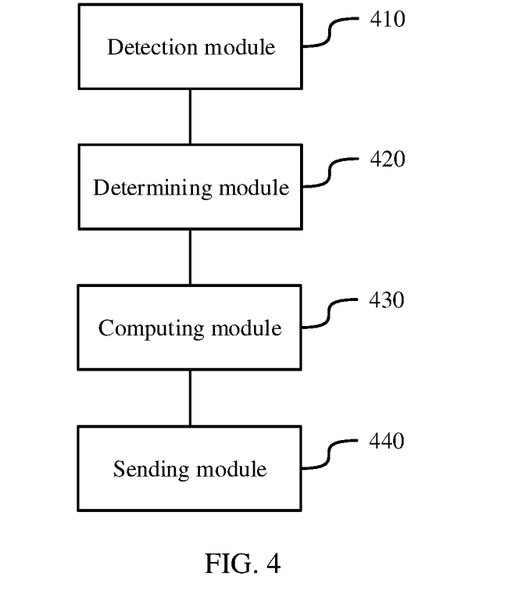
FIG. 4 is a schematic diagram of a structure of a data transmission apparatus according to an embodiment.

Based on a same concept, an embodiment further provides a data transmission apparatus. As shown in FIG. 4, the apparatus includes a detection module 410, a determining module 420/a computing module 430, and a sending module 440.

The detection module 410 is configured to detect a delay of each path between a source end and a sink end. A detection function in step 201 and another implicit step may be implemented.

The determining module 420 is configured to determine a to-be-used second path when a first path currently used to transmit a packet is determined to be a congested path. A determining function in step 202 and another implicit step may be implemented.

The computing module 430 is configured to determine a delay difference between the first path and the second path based on a delay of the first path and a delay of the second path. For example, a delay difference computing function in step 203 and another implicit step may be implemented.

The sending module 440 is configured to send the to-be-sent packets to the sink end through the second path based on the delay difference. A sending function in step 204 and another implicit step may be implemented.

In a possible implementation, the computing module 430 is configured to:
subtract the delay of the second path from the delay of the first path to obtain the delay difference between the first path and the second path.

In a possible implementation, the sending module 440 is configured to:
if the delay difference is less than 0, send the to-be-sent packets to the sink end through the second path.

In a possible implementation, the sending module 440 is configured to:
if the delay difference is greater than 0, determine, in the to-be-sent packets, whether there are two adjacent packets whose sending time points are within preset duration after a current time point and whose sending time interval is greater than the delay difference;
if there are such adjacent packets, send, to the sink end through the first path, a first packet whose sending sequence is earlier in the two adjacent packets whose sending time interval is greater than the delay difference, and a packet whose sending sequence is earlier than the first packet in the to-be-sent packets, and send, to the sink end through the second path, a second packet whose sending sequence is later in the two adjacent packets, and a packet whose sending sequence is later than the second packet in the to-be-sent packets;
if there are no such adjacent packets, determine, at least one buffer device from network devices on the second path; and
send the to-be-sent packets to the sink end through the second path, where in a process of transmitting the to-be-sent packets through the second path, the to-be-sent packets pass through each buffer device, the buffer device is configured to buffer the to-be-sent packets, and a sum of buffer duration of each buffer device for the to-be-sent packets is greater than or equal to the delay difference.

In a possible implementation, the apparatus further includes:
a writing module, configured to write identification information of each of the at least one buffer device and corresponding buffer duration into preset fields of the first packet in the to-be-sent packets.

In a possible implementation, the apparatus further includes:
a storage module, configured to obtain, based on a preset period, buffer capability information of each network device on each path between the source end and the sink end, and correspondingly store identification information and the buffer capability information of each network device, where the buffer capability information of each network device is used to indicate maximum buffer duration or a buffer duration range of the network device for a packet.

It should be noted that when the data transmission apparatus provided in the foregoing embodiments transmits data, division of the foregoing function modules is used only as an example for description. In actual application, allocation of the foregoing functions as required may be completed by different function modules, that is, an internal structure of the network device is divided into different function modules to complete all or some of the described functions. In addition, the data transmission apparatus provided in the foregoing embodiments pertains to a same concept as embodiments of the data transmission method. For an implementation process, refer to the method embodiments. Details are not described herein again.

In the foregoing embodiment, all or part of the software, hardware, firmware, or any combination thereof may be implemented. When the software is used for implementation, all or part of the implementation may be implemented in a form of a computer program product. The computer program product includes one or more computer instructions. When the computer program instructions are loaded and executed on a device, all or a part of the procedures or functions are generated according to embodiments. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, and microwave, or the like) manner. The computer-readable storage medium may be any usable medium accessible by a device, or a data storage device, such as a server or a data center, integrating one or more usable media. The usable media may be a magnetic medium (for example, a floppy disk, a hard disk, a magnetic tape, or the like), an optical medium (for example, a digital video disc (DVD), or the like), or a semiconductor medium (for example, a solid-state drive, or the like).

In an example embodiment, a computer-readable storage medium is further provided, for example, a memory including instructions. The instructions may be executed by a processor in a terminal to complete the resource obtaining method in the following embodiments. For example, the computer-readable storage medium may be a ROM, a random access memory (RAM), a CD-ROM, a magnetic tape, a floppy disk, an optical data storage device, or the like.

A person of ordinary skill in the art may understand that all or some of the steps of the foregoing embodiments may be implemented by hardware or a program instructing related hardware. The program may be stored in a computer-readable storage medium. The storage medium may include a read-only memory, a magnetic disk, or an optical disc.

The foregoing description in embodiments is merely an example and is not intended as limiting. Any modification, equivalent replacement, or improvement made without departing from the spirit and principle shall fall within the scope of the embodiments.

The invention claimed is:

1. A data transmission method comprising:
   detecting a delay of each path between a source end and a sink end;
   determining a to-be-used second path when a first path currently used to transmit a packet is determined to be a congested path;
   determining a delay difference between the first path and the second path based on a delay of the first path and a delay of the second path; and
   sending one or more to-be-sent packets to the sink end through the second path based on the delay difference and buffer capability information of each network device on each path between the source end and the sink end.

2. The data transmission method according to claim 1, further comprising:
   subtracting the delay of the second path from the delay of the first path to obtain the delay difference between the first path and the second path.

3. The data transmission method according to claim 2, further comprising:
   when the delay difference is less than 0, sending the to-be-sent packets to the sink end through the second path.

4. The data transmission method according to claim 2, further comprising:
   when the delay difference is greater than 0, determining, in the to-be-sent packets, whether there are two adjacent packets whose sending time points are within a preset duration after a current time point and whose sending time interval is greater than the delay difference;
   when there are the two adjacent packets,
   sending, to the sink end through the first path, a first packet whose sending sequence is earlier in the two adjacent packets whose sending time interval is greater than the delay difference, and a packet whose sending sequence is earlier than the first packet in the to-be-sent packets, and
   sending, to the sink end through the second path, a second packet whose sending sequence is later in the two adjacent packets, and a packet whose sending sequence is later than the second packet in the to-be-sent packets;
   when there are no such adjacent packets,
   determining, at least one buffer device from network devices on the second path; and
   sending the to-be-sent packets to the sink end through the second path, wherein in a process of transmitting the to-be-sent packets through the second path, the to-be-sent packets pass through each buffer device, the buffer device is configured to buffer the to-be-sent packets, and a sum of buffer duration of each buffer device for the to-be-sent packets is greater than or equal to the delay difference.

5. The data transmission method according to claim 4, wherein, when there are no such adjacent packets, the method further comprises:
   writing identification information of each of the at least one buffer device and corresponding buffer duration into preset fields of the first packet in the to-be-sent packets.

6. The data transmission method according to claim 5, further comprising:
   obtaining, based on a preset period, the buffer capability information of each network device on each path between the source end and the sink end, and correspondingly storing identification information and the buffer capability information of each network device, wherein the buffer capability information of each network device is used to indicate a maximum buffer duration or a buffer duration range of the network device for a packet.

7. A source end, comprising a processor and a memory, wherein
   the memory stores one or more programs, and the one or more programs are configured to be executed by the processor to implement the method according to claim 1.

8. A non-transitory computer-readable storage medium, comprising instructions, wherein when the computer-readable storage medium is run on a source end, the source end is enabled to perform the method according to claim 1.

9. A data transmission apparatus comprising:
   one or more processors; and
   a non-transitory computer-readable memory storing a program to be executed by the one or more processors, the program including instructions that, when executed by the one or more processors, cause the apparatus to:
   detect a delay of each path between a source end and a sink end;
   determine a to-be-used second path when a first path currently used to transmit a packet is determined to be a congested path;
   determine a delay difference between the first path and the second path based on a delay of the first path and a delay of the second path; and
   send one or more to-be-sent packets to the sink end through the second path based on the delay difference and buffer capability information of each network device on each path between the source end and the sink end.

10. The data transmission apparatus according to claim 9, wherein the program further comprises instructions that cause the apparatus to:
    subtract the delay of the second path from the delay of the first path to obtain the delay difference between the first path and the second path.

11. The data transmission apparatus according to claim 10, wherein the program further comprises instructions that cause the apparatus to:
    when the delay difference is less than 0, send the to-be-sent packets to the sink end through the second path.

12. The data transmission apparatus according to claim 10, wherein the program further comprises instructions that cause the apparatus to:
    when the delay difference is greater than 0, determine, in the to-be-sent packets, whether there are two adjacent packets whose sending time points are within preset duration after a current time point and whose sending time interval is greater than the delay difference;
    when there are the two adjacent packets, send, to the sink end through the first path, a first packet whose sending sequence is earlier in the two adjacent packets whose sending time interval is greater than the delay difference, and a packet whose sending sequence is earlier than the first packet in the to-be-sent packets, and send, to the sink end through the second path, a second packet whose sending sequence is later in the two adjacent packets, and a packet whose sending sequence is later than the second packet in the to-be-sent packets;

when there are no such adjacent packets, determine, at least one buffer device from network devices on the second path; and send the to-be-sent packets to the sink end through the second path, wherein in a process of transmitting the to-be-sent packets through the second path, the to-be-sent packets pass through each buffer device, the buffer device is configured to buffer the to-be-sent packets, and a sum of buffer duration of each buffer device for the to-be-sent packets is greater than or equal to the delay difference.

13. The data transmission apparatus according to claim 12, wherein the program further comprises instructions that cause the apparatus to:

write identification information of each of the at least one buffer device and corresponding buffer duration into preset fields of the first packet in the to-be-sent packets.

14. The data transmission apparatus according to claim 13, wherein the program further comprises instructions that cause the apparatus to:

obtain, based on a preset period, the buffer capability information of each network device on each path between the source end and the sink end, and correspondingly store identification information and the buffer capability information of each network device, wherein the buffer capability information of each network device is used to indicate a maximum buffer duration or a buffer duration range of the network device for a packet.

* * * * *